United States Patent
Mega

(10) Patent No.: US 10,509,480 B2
(45) Date of Patent: Dec. 17, 2019

(54) ROTARY OPERATION DEVICE

(71) Applicant: KABUSHIKI KAISHA TOKAI RIKA DENKI SEISAKUSHO, Aichi (JP)

(72) Inventor: Susumu Mega, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 15/773,412

(22) PCT Filed: Nov. 2, 2016

(86) PCT No.: PCT/JP2016/082557
§ 371 (c)(1),
(2) Date: May 3, 2018

(87) PCT Pub. No.: WO2017/086159
PCT Pub. Date: May 26, 2017

(65) Prior Publication Data
US 2018/0321756 A1 Nov. 8, 2018

(30) Foreign Application Priority Data

Nov. 18, 2015 (JP) ................. 2015-225717

(51) Int. Cl.
*G06F 3/02* (2006.01)
*G06T 11/60* (2006.01)
*H01H 19/54* (2006.01)

(52) U.S. Cl.
CPC ............... *G06F 3/02* (2013.01); *G06T 11/60* (2013.01); *H01H 19/54* (2013.01)

(58) Field of Classification Search
None
See application file for complete search history.

(56) References Cited

U.S. PATENT DOCUMENTS

| 5,666,102 A | 9/1997 | Lahiff | |
|---|---|---|---|
| 2004/0018918 A1* | 1/2004 | Reyes | A63B 22/02 482/54 |

(Continued)

FOREIGN PATENT DOCUMENTS

| JP | 3-82637 A | 4/1991 |
|---|---|---|
| JP | 7-205682 A | 8/1995 |

(Continued)

OTHER PUBLICATIONS

International Search Report issued in a corresponding application No. PCT/JP2016/082557 dated Jan. 31, 2017.

(Continued)

*Primary Examiner* — Kyle Zhai
(74) *Attorney, Agent, or Firm* — Roberts Mlotkowski Safran Cole Calderon P.C.

(57) ABSTRACT

A rotary operation device includes a rotary operation part on which a rotation operation is performed, a rotation detector configured to detect an amount of rotation of the rotary operation part, a display part integrally formed with the rotary operation part and configured to display an image while rotating with the rotary operation part, and a controller configured to control the display part such that the image is displayed moved in a direction opposite to a rotation direction of the rotary operation part based on the detected amount of rotation so as to look still to an operator.

8 Claims, 3 Drawing Sheets

(56) References Cited

U.S. PATENT DOCUMENTS

| | | | | |
|---|---|---|---|---|
| 2005/0248575 A1* | 11/2005 | Chou | ............... | G06T 13/00 345/473 |
| 2009/0009491 A1* | 1/2009 | Grivna | ............... | G06F 3/033 345/184 |
| 2011/0298721 A1* | 12/2011 | Eldridge | ............... | G06F 3/0362 345/173 |
| 2013/0015964 A1* | 1/2013 | Muller | ............... | B60K 35/00 340/459 |

FOREIGN PATENT DOCUMENTS

| | | |
|---|---|---|
| JP | 2009-96210 A | 5/2009 |
| JP | 2012-166669 A | 9/2012 |
| JP | 2014-2546 A | 1/2014 |
| WO | 98/03365 A1 | 1/1998 |

OTHER PUBLICATIONS

International Preliminary Report on Patentability issued in the corresponding Application No. PCT/JP2016/082557 dated May 22, 2018.

* cited by examiner

ROTARY OPERATION DEVICE

CROSS-REFERENCE TO RELATED APPLICATIONS

The present application is a U.S. National Phase of PCT/JP2016/082557 filed on Nov. 2, 2016 claiming priority to Japanese Patent Application No. 2015-225717 filed on Nov. 18, 2015. The disclosure of the PCT Application is hereby incorporated by reference into the present Application.

TECHNICAL FIELD

The present invention relates to a rotary operation device.

BACKGROUND ART

A known function selection type air condition control device includes an operation part including a push button that selects one of a plurality of air conditioning functions of air conditioning equipment and a dial that sets air condition adjustment for the air conditioning function selected by the push button, and includes a display part including a plurality of display blocks corresponding to the plurality of air conditioning functions, each of the display blocks displaying a set content of the air condition adjustment set by the dial for the air conditioning function selected by the push button (for example, see Patent Document 1).

The operation part includes the push button provided on an inner diameter side and the dial provided on an outer circumferential side of the push button. The function selection type air condition control device includes the operation part and the display part aligned on a panel.

CITATION LIST

Patent Literature

Patent Document 1: JP 2012-166669A

SUMMARY OF INVENTION

Technical Problem

The function selection type air condition control device disclosed in Patent Document 1 needs a wide arrangement space because at least two parts, i.e. the operation part and the display part, are disposed at separate places, thus making size reduction difficult. Furthermore, the function selection type air condition control device enables only one display in a designated display position.

An object of the invention is to provide a rotary operation device that is small in size and has a high degree of flexibility in display.

Solution to Problem

A rotary operation device according to one embodiment of the invention includes a rotary operation part on which a rotation operation is performed, a rotation detector configured to detect an amount of rotation of the rotary operation part, a display part integrally formed with the rotary operation part and configured to display an image while rotating with the rotary operation part, and a controller configured to control the display part such that the image is displayed moved in a direction opposite to a rotation direction of the rotary operation part based on the detected amount of rotation so as to look still to an operator.

Advantageous Effects of Invention

According to one embodiment of the invention, a rotary operation device that is small in size and has a high degree of flexibility in display can be provided.

DESCRIPTION OF EMBODIMENTS

Overview of Embodiment

A rotary operation device according to an embodiment includes a rotary operation part on which a rotation operation is performed, a rotation detector configured to detect an amount of rotation of the rotary operation part, a display part integrally formed with the rotary operation part and configured to display an image while rotating with the rotary operation part, and a controller configured to control the display part such that the image is moved in a direction opposite to a rotation direction of the rotary operation part on the basis of the detected amount of rotation, is displayed, and looks still to an operator.

The rotary operation device includes the rotary operation part and the display part integrally formed with each other, so that the rotary operation device can be smaller than that in a case in which a rotary operation part and a display part are separately disposed. The rotary operation device allows the display part to display various images and also allows an image to be displayed as if the image stands still even when a rotation operation is performed. Thus, the rotary operation device has a higher degree of flexibility in display than a case in which a display part displays one image in a designated display position.

Embodiment

Overview of Rotary Operation Device 1

Figure 1A:
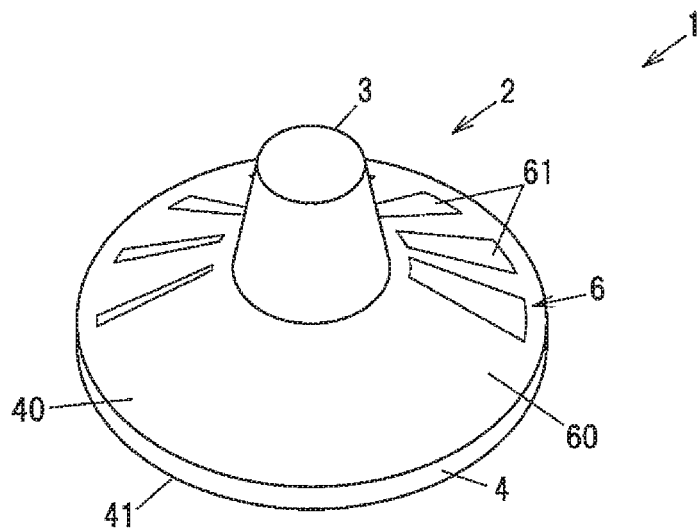
FIG. 1A is a perspective view illustrating an example of a rotary operation device according to an embodiment.
Figure 1B:
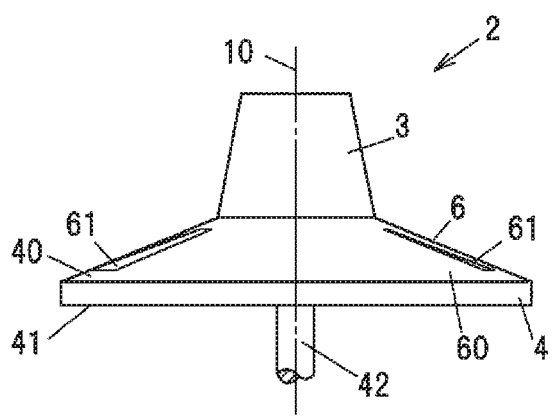
FIG. 1B is a side view illustrating an example of the rotary operation device.
Figure 1C:
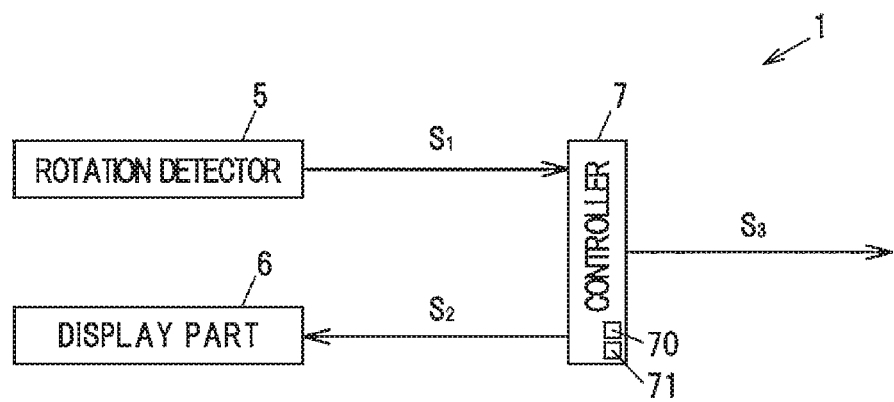
FIG. 1C is a block diagram illustrating an example of a configuration of the rotary operation device.

FIG. 1A is a perspective view illustrating an example of a rotary operation device according to an embodiment. FIG. 1B is a side view illustrating an example of the rotary operation device. FIG. 1C is a block diagram illustrating an example of a configuration of the rotary operation device. In the drawings associated with the following embodiment, ratios between elements in the drawings may be different from the actual ratios. In addition, in FIG. 1C, arrows indicate the flows of primary signals, information, and the like.

This rotary operation device 1 is, for example, electrically connected to an electronic device and used as an operation part that changes a set amount of a function of the electronic device according to the amount of rotation. Examples of the electronic device include air conditioning devices, navigation devices, music playback devices, video playback devices, and the like that are installed in vehicles, but the electronic device is not limited thereto.

As illustrated in FIGS. 1A to 1C, for example, the rotary operation device 1 includes a dial 2 as a rotary operation part on which a rotation operation is performed, a rotation detector 5 that detects the amount of rotation of the dial 2, a display part 6 that is integrally formed with the dial 2 and displays an image while rotating with the dial 2, and a controller 7 that controls the display part 6 such that the image is moved in a direction opposite to a rotation direction of the dial 2 on the basis of the detected amount of rotation, is displayed, and looks still to an operator.

Configuration of Dial 2

As illustrated in FIGS. 1A and 1B, as an example, the dial 2 includes a knob 3 having a conical shape with a truncated upper portion and a flange 4 protruding in a radial direction of the knob 3 and having a disk shape. The flange 4 has an upper surface 40 inclined downward in a paper plane of FIG. 1B. The display part 6 is disposed on the upper surface 40.

As illustrated in FIG. 1B, a shaft 42 extending along a rotational axis 10 is attached to the dial 2 on a lower surface 41 side. The dial 2 is configured to rotate clockwise and counterclockwise about the rotational axis 10.

Configuration of Rotation Detector 5

Examples of the rotation detector 5 include rotary encoders capable of identifying a rotation direction. As an example, the rotary encoder includes a light source part that emits light, a disk that is attached to the shaft 42 of the dial 2 and includes slits formed in a grid pattern, and a light receiving part that receives light from the light source part via the slits of the disk. The rotary encoder is an incremental type or an absolute type and is configured to output a detected amount of rotation as rotation amount information $S_1$ to the controller 7.

The rotation amount information $S_1$ is, for example, information about the number of pulses of received light and a rotation angle. As an example, the rotation detector 5 in the present embodiment outputs information about a rotation angle as the rotation amount information $S_1$. Thus, as an example, the amount of rotation in the present embodiment is a rotation angle from reference.

Note that the rotation detector 5 is not limited to the rotary encoder and may be a device that detects the amount of rotation with a magnetometric sensor, a device that emits light to the dial 2 and detects the amount of rotation by its reflection, and the like.

Configuration of Display Part 6

Examples of the display part 6 include liquid-crystal displays capable of freely displaying various images. Note that the display part 6 is not limited to the liquid-crystal display and may be an organic electro luminescence (EL) display, an electrophoretic-type display used for an electronic paper, a microcapsule-type display, a microcup-type display, and the like.

The display part 6 displays an image on the basis of a display control signal $S_2$ output from the controller 7. FIGS. 1A and 1B each illustrate an example in which the display part 6 displays a plurality of images 61 that are long and narrow in the radial direction on a display screen 60 on the flange 4. In this example, these images 61 are images having the number and a width increased as the amount of rotation increases.

The display part 6 illustrated in FIGS. 1A and 1B is controlled so as to increase the number of the displayed images 61 in a circumferential direction according to a rotation operation. An operator can identify the amount of rotation and a rotation direction by the images 61 that increase and decrease according to the amount of rotation and can also identify an increase and a decrease in a set value set by the dial 2.

Herein, the display part 6 displays at least one of a numerical value according to the amount of rotation, an image according to the amount of rotation, an icon indicating an assigned function, and a predetermined image.

As an example, the numerical value according to the amount of rotation is a value such as a set temperature and an airflow rate of the air conditioning device, a volume of sound of an audio playback device, and a reduced scale of a map displayed by a navigation device.

As an example, the image according to the amount of rotation is an image displayed radially and having the number increased with an increase in the amount of rotation, an image having the size changed gradually according to the amount of rotation, a predetermined image having a display switched according to the amount of rotation, an image having a gradation region increased according to the amount of rotation, and the like.

As an example, the icon indicating an assigned function is an icon indicating a function assigned to the rotary operation device 1. For example, when a function of setting a temperature of an air conditioning device is assigned to the rotary operation device 1, the display part 6 displays an icon indicating a temperature. For example, when a function of setting a volume of an audio playback device is assigned to the rotary operation device 1, the display part 6 displays an icon associated with a sound of a headphone or the like.

As an example, the predetermined image is an image displayed for welcoming a driver when a power source of a vehicle turns on and a door of the vehicle is unlocked and opened, an image indicating a failure in an electronic device, and the like.

The display part 6 can display a plurality of the above-mentioned images and icons at the same time by control of the controller 7. For example, when a function of setting a temperature of an air conditioning device is assigned to the rotary operation device 1, the display part 6 displays an icon indicating a temperature and a currently set temperature at the same time.

Configuration of Controller 7

Figure 2A:
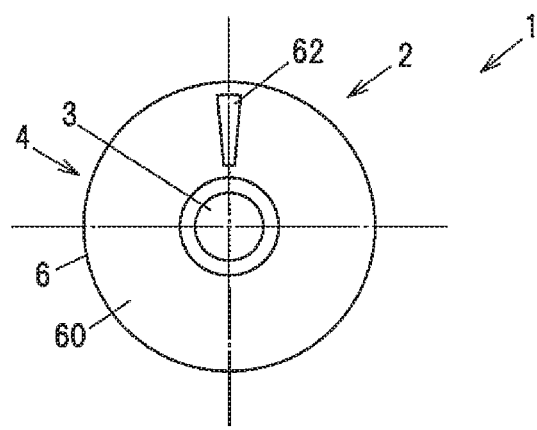
FIG. 2A is a schematic diagram illustrating an example in which display of the rotary operation device according to the embodiment moves.
Figure 2B:
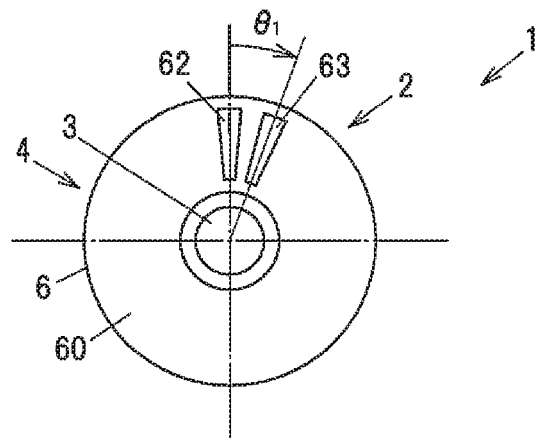
FIG. 2B is a schematic diagram illustrating an example in which display of the rotary operation device according to the embodiment moves.
Figure 2C:
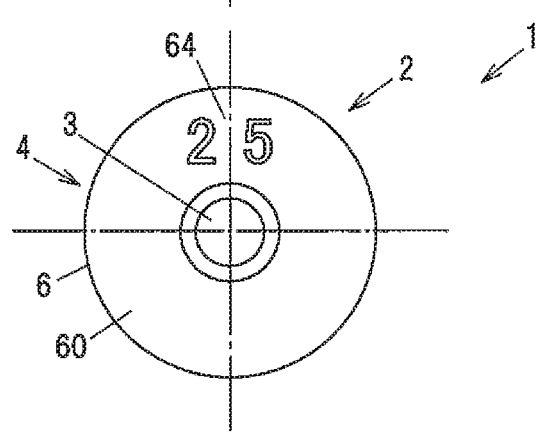
FIG. 2C is a schematic diagram illustrating an example in which display of the rotary operation device according to the embodiment moves.
Figure 2D:
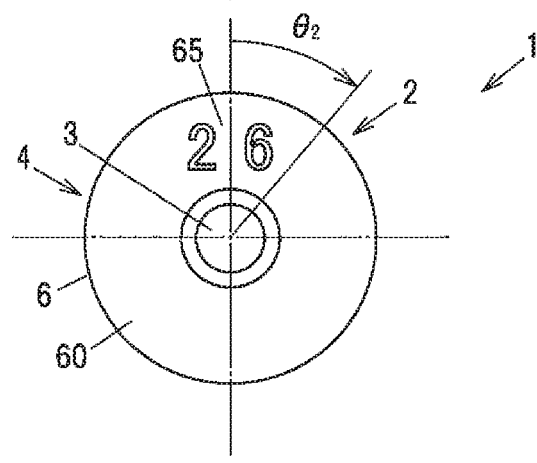
FIG. 2D is a schematic diagram illustrating an example in which display of the rotary operation device according to the embodiment moves.

FIGS. 2A to 2D are schematic diagrams each illustrating an example in which display of the rotary operation device according to the embodiment moves. FIGS. 2A and 2B each illustrate an example in which display increases according to the amount of rotation. FIGS. 2C and 2D each illustrate an example in which a number increases according to the amount of rotation.

The controller 7 is, for example, a microcomputer including a central processing unit (CPU) that carries out computations, processes, and the like on acquired data in accordance with a stored program, a random access memory (RAM) and a read only memory (ROM) that are semiconductor memories, and the like. A program for operations of the controller 7, image information 70 being information about an image displayed on the display part 6, and set rotation amount information 71 being information about a predetermined amount of rotation, for example, are stored in the ROM. The RAM is used as a storage region that temporarily stores computation results and the like, for example.

Note that the image information 70 and the set rotation amount information 71 may be, for example, stored in advance, or acquired from the outside, stored in the RAM, and able to be updated.

The controller 7 is configured to output the display control signal $S_2$ that controls the display part 6, and to also generate operation information $S_3$ according to the amount of rotation and output the operation information $S_3$ to an electronic device to which the controller 7 is connected. The display control signal $S_2$ is generated according to the amount of rotation based on the rotation amount information $S_1$. In other words, when the amount of rotation reaches a predetermined amount of rotation, the controller 7 moves a displayed image in a direction opposite to a rotation direction and causes the image to be displayed.

Specifically, as illustrated in FIGS. 2A and 2B, for description of a case in which an image increases every amount of rotation $\theta_1$, the controller 7 first, for example, generates the display control signal $S_2$ for causing an image 62 based on the image information 70 to be displayed at 12 o'clock position in a paper plane of FIG. 2A in an initial state where no operation is performed, and outputs the display control signal $S_2$ to the display part 6. Note that the image 62 corresponds to the above-mentioned displayed image.

Next, the controller 7 monitors the amount of rotation on the basis of the rotation amount information $S_1$ acquired from the rotation detector 5, and moves, when the amount of rotation reaches a predetermined amount of rotation based on the set rotation amount information 71, the image 62 in a direction opposite to a rotation direction of the dial 2 by the predetermined amount of rotation. As an example, when a predetermined amount of rotation is 1° and the amount of rotation reaches 1°, the controller 7 moves the image 62 in a direction opposite to a rotation direction by 1° and causes the image 62 to be displayed.

When the amount of rotation reaches $\theta_1$ while the image 62 is moved, as illustrated in FIG. 2B, the controller 7 then moves the image 62 and causes the image 62 to be displayed, and also outputs, to the display part 6, the display control signal $S_2$ for newly causing an image 63 to be displayed in a position rotated by $\theta_1$.

In this way, the image 62 looks still to an operator, and the image 63 also looks as if the image 63 is displayed to be adjacent to the image 62 to the operator when the amount of rotation reaches $\theta_1$.

As still another example, as illustrated FIGS. 2C and 2D, a case in which a number displayed as an image 64 increases every amount of rotation $\theta_2$ is described. Note that it is assumed that the rotary operation device 1 is configured as an operation part of an air conditioning device installed in a vehicle to adjust a set temperature.

For example, the controller 7 generates the display control signal $S_2$ for causing the image 64 indicating a current set temperature based on the image information 70 to be displayed at 12 o'clock position in a paper plane of FIG. 2C, and outputs the display control signal $S_2$ to the display part 6.

Next, the controller 7 monitors the amount of rotation on the basis of the rotation amount information $S_1$ acquired from the rotation detector 5, and moves, when the amount of rotation reaches a predetermined amount of rotation based on the set rotation amount information 71, the image 64 in a direction opposite to a rotation direction of the dial 2 by the predetermined amount of rotation. As an example, when a predetermined amount of rotation is 1° and the amount of rotation reaches 1°, the controller 7 moves the image 64 in a direction opposite to a rotation direction by 1° and causes the image 64 to be displayed.

When the amount of rotation reaches $\theta_2$ while the image 64 is moved, as illustrated in FIG. 2D, the controller 7 then outputs, to the display part 6, the display control signal $S_2$ for causing an image 65 having the number of the image 64 increased by 1 to be displayed instead of the image 64.

In this way, the image 64 looks still to an operator, and the image 64 also looks as if the image 64 having the number increased is displayed to the operator when the amount of rotation reaches $\theta_2$.

Use Example of Rotary Operation Device 1

Figure 3A:
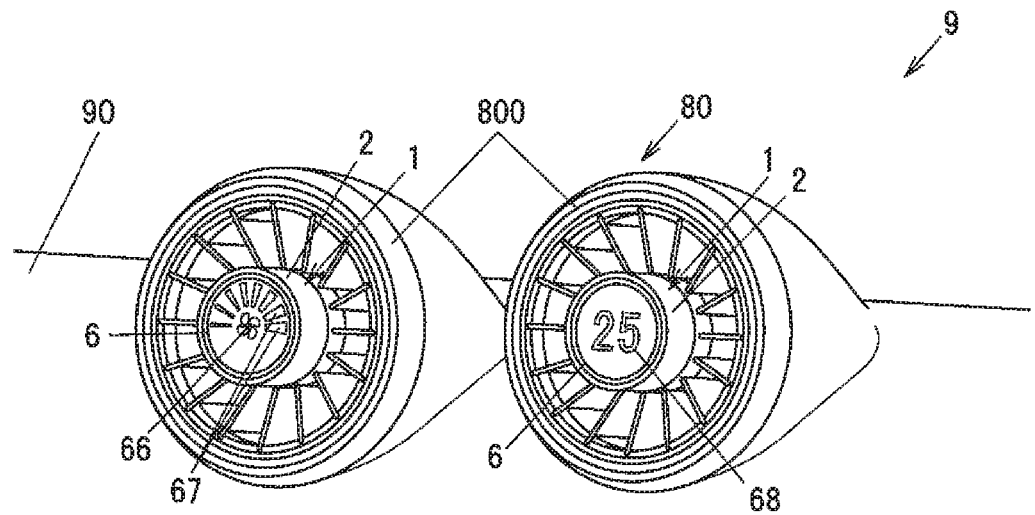
FIG. 3A is a schematic diagram illustrating an example in which the rotary operation device according to the embodiment is used as an operation part of an air conditioning device.
Figure 3B:
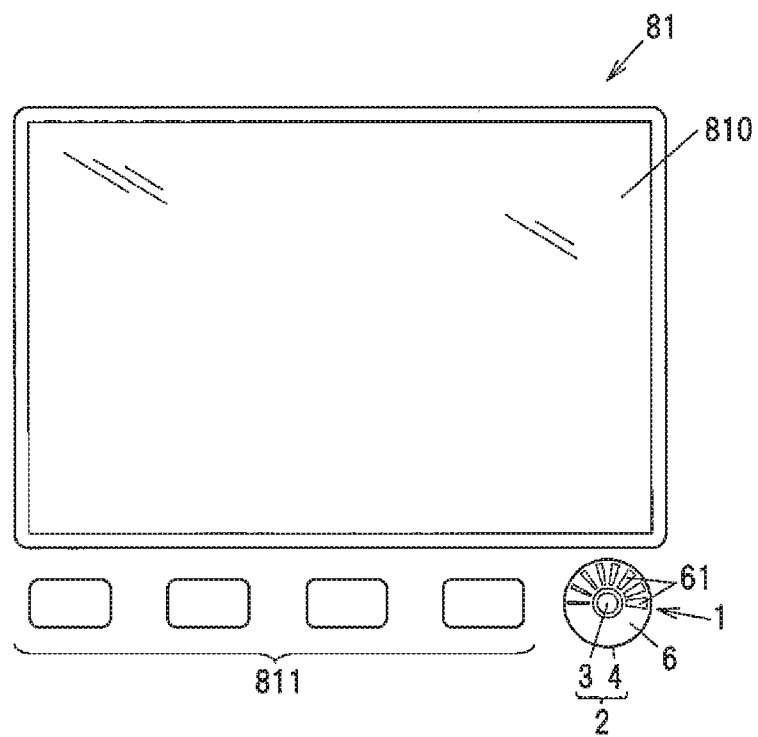
FIG. 3B is a schematic diagram illustrating an example in which the rotary operation device according to the embodiment is used as an operation part of a navigation device.

FIG. 3A is a schematic diagram illustrating an example in which the rotary operation device according to the embodiment is used as an operation part of an air conditioning device. FIG. 3B is a schematic diagram illustrating an example in which the rotary operation device according to the embodiment is used as an operation part of a navigation device.

The rotary operation device 1 illustrated in FIG. 3A is disposed in an air outlet 800 of an air conditioning device 80. The air outlet 800 is disposed so as to protrude from an upper surface of an instrument panel 90 of a vehicle 9.

The dial 2 of the rotary operation device 1 has a columnar shape and has an upper surface on which the display part 6 is disposed. The display part 6 on the left side of the paper plane of FIG. 3A displays an icon 66 indicating that an airflow rate can be adjusted and an image 67 indicating an airflow rate. The display part 6 on the right side displays an image 68 indicating a current set temperature.

When the amount of rotation of the dial 2 reaches a predetermined amount of rotation, the icon 66 moves in a direction opposite to a rotation direction of the dial 2 and is displayed as if the icon 66 stands still.

The rotary operation device 1 is small because the dial 2 and the display part 6 are integrally formed. Thus, as illustrated in FIG. 3A, the rotary operation device 1 can be easily disposed even in a limited arrangement space like the air outlet 800 protruding from the instrument panel 90.

The rotary operation device 1 illustrated in FIG. 3B is disposed next to a button group 811 near a display device 810. A touch panel as an operation part that allows a reduced scale of a navigation device 81 and a volume of a navigation voice to be adjusted is disposed on a front surface of the display device 810.

For example, the navigation device 81 may have better operability with a dial operation part than operation with a button and a touch operation to a touch panel, but it is sometimes difficult to dispose a dial operation part having a two-part configuration of a display part and a dial next to the button group 811. However, the rotary operation device 1 is small, so that the rotary operation device 1 can be easily disposed in a limited arrangement space and have better operability because an operation amount can be checked with the display part 6.

An example of operations of the rotary operation device 1 according to the present embodiment will be described below. Herein, a case in which the image 64 and the image 65 respectively illustrated in FIG. 2C and FIG. 2D are displayed is described.

Operations

When a power source of a vehicle turns on, the controller 7 of the rotary operation device 1 generates the display control signal $S_2$ for causing a current set temperature based on the image information 70 to be displayed, and outputs the display control signal $S_2$ to the display part 6. The display part 6 displays the image 64 indicating a current set temperature of 25° C. on the basis of the input display control signal $S_2$.

Next, the controller 7 monitors the amount of rotation of the dial 2 on the basis of the set rotation amount information 71 and the rotation amount information $S_1$ acquired from the rotation detector 5. When the amount of rotation reaches a predetermined amount of rotation, the controller 7 moves the image 64 in a direction opposite to a rotation direction of the dial 2 by the predetermined amount of rotation.

When the amount of rotation reaches the amount of rotation $\theta_2$ that increases the set temperature while the image 64 is moved, the controller 7 then outputs, to the display part 6, the display control signal $S_2$ for causing the image 65 having the number of the image 64 increased by 1 to be displayed instead of the image 64. The display part 6 displays the image 65 on the basis of the input display control signal $S_2$.

Effects of Embodiment

The rotary operation device 1 according to the present embodiment is small and has a high degree of flexibility in display. The rotary operation device 1 has a configuration in which the display part 6 is disposed on the dial 2 and the display part 6 rotates with the dial 2. The rotary operation device 1 then moves an image displayed by rotating the display part 6 in a direction opposite to a rotation direction of the dial 2 when the amount of rotation of the dial 2 reaches a predetermined amount of rotation, and causes the image to be displayed such that the image is not visually recognized to be rotating. Accordingly, the rotary operation device 1 can freely display an image on the display part 6, thus having a high degree of flexibility in display. When a display part that freely displays an image and a dial are disposed in combination, the display part is not suitable for rotation and is thus disposed at a place separate from the dial. The rotary operation device 1 includes the dial 2 and the display part 6 integrally formed with each other, this makes the rotary operation device 1 smaller than a configuration in which a dial and a display part are separately disposed.

The rotary operation device 1 can display various images on the display part 6, thus facilitating display according to specifications of an electronic device connected thereto more easily than a configuration in which a display part is modified according to a display image, and the rotary operation device 1 can thus be used as an operation part of various electronic devices.

When the rotary operation device 1 includes the display part 6 emitting light by itself, an illumination device that illuminates the dial 2 is not needed, thus reducing manufacturing cost.

The controller 7 according to another embodiment is configured to switch from a predetermined amount of rotation in which an image starts moving according to a rotation speed of the dial 2 to another predetermined amount of rotation. The controller 7 includes information about a plurality of amounts of rotation according to the rotation speed as the set rotation amount information 71.

For example, the controller 7 allows a predetermined amount of rotation to be reached in a short time at a fast rotation speed even when the predetermined amount of rotation is great, and allows an image to look still even when the start of moving an image is late.

However, at a slow rotation speed of the dial 2, it takes time to reach a predetermined amount of rotation and an image rotating with the dial 2 is visually recognized, so that the image may not look still.

Therefore, the controller 7 is configured to calculate a rotation speed on the basis of the amount of rotation acquired from the rotation detector 5 and switch the amount of rotation until start of movement according to the rotation speed. With this configuration, the rotary operation device 1 allows an image to look still whether the dial 2 rotates fast or slow.

Although several embodiments and modifications of the invention have been described above, these embodiments and modifications are merely examples, and the invention according to the claims is not intended to be limited to the embodiments and modifications. Such novel embodiments and modified examples can be implemented in various other forms, and various omissions, substitutions, changes, and the like can be made without departing from the spirit and scope of the present invention. In addition, all combinations of the features described in these embodiments and modifications are not necessary means to solve the problem. Furthermore, these embodiments and modified examples are included within the spirit and scope of the invention and also within the scope of the invention described in the claims and equivalents thereof.

REFERENCE SIGNS LIST

1 Rotary operation device
2 Dial
5 Rotation detector
6 Display part
7 Controller

The invention claimed is:

1. A rotary operation device that controls a device in a vehicle, comprising:
  a rotary operation part located in the vehicle on which a manual rotation operation is performed by a user to control a device in the vehicle;
  a rotation detector including a rotary encoder configured to detect an amount of rotation of the rotary operation part;
  a display part having a display surface integrally formed with the rotary operation part and configured to display an image while rotating with the rotary operation part; and
  a controller including a CPU configured to control the display part such that the image is displayed moved in a direction opposite to a rotation direction of the rotary operation part based on the detected amount of rotation,
  wherein the rotary operation part comprises a rotary dial, the display surface is a surface of the dial, and the CPU moves the image on the surface of the dial opposite to the rotation direction when the manual rotation operation is performed so that the image appears to maintain a same position on the dial to the user.

2. The rotary operation device according to claim 1, wherein the display part is configured to display on the display surface, as the image, at least one of a numerical value according to the amount of rotation, an image according to the amount of rotation, an icon indicating an assigned function, and a predetermined image.

3. The rotary operation device according to claim 1, wherein when the amount of rotation reaches a predetermined amount of rotation, the controller is configured to redisplay the displayed image moved in a direction opposite to the rotation direction.

4. The rotary operation device according to claim 1, wherein the controller is configured to switch from a predetermined amount of rotation at which the image starts moving to another predetermined amount of rotation according to a rotation speed of the rotary operation part.

5. The rotary operation device according to claim 1, wherein the rotary operation part has a cylindrical shape protruding from a front surface of an attachment part to which the rotary operation part is attached, and
wherein the display part is disposed outside the rotary operation part in a radial direction of the rotary operation part.

6. The rotary operation device according to claim 1, wherein the rotary operation part has a hollow cylindrical shape protruding from a front surface of an attachment part to which the rotary operation part is attached, and
wherein the display part is disposed inside the rotary operation part in a radial direction of the rotary operation part.

7. A rotary operation device that controls a device in a vehicle, comprising:
a rotary operation part located in the vehicle on which a rotation operation is performed to control a device in the vehicle;
a rotation detector including a rotary encoder configured to detect an amount of rotation of the rotary operation part;
a display part having a display surface integrally formed with the rotary operation part and configured to display an image while rotating with the rotary operation part; and
a controller including a CPU configured to control the display part such that the image is displayed moved in a direction opposite to a rotation direction of the rotary operation part based on the detected amount of rotation,
wherein the rotary operation part comprises a rotary dial having a cylindrical shape protruding from a front surface of an attachment part to which the rotary operation part is attached, and wherein the display part is a surface of the dial disposed outside the rotary operation part in a radial direction of the rotary operation part, and
wherein the CPU moves the image on the surface of the dial opposite to the rotation direction when the rotation operation is performed so that the image appears to maintain a same position on the dial to the user.

8. A rotary operation device located in a vehicle, comprising:
a rotary operation part located in the vehicle on which a rotation operation is performed to control a device in the vehicle;
a rotation detector including a rotary encoder configured to detect an amount of rotation of the rotary operation part;
a display part having a display surface integrally formed with the rotary operation part and configured to display an image while rotating with the rotary operation part; and
a controller including a CPU configured to control the display part such that the image is displayed moved in a direction opposite to a rotation direction of the rotary operation part based on the detected amount of rotation,
wherein the rotary operation part includes a rotary dial having a hollow cylindrical shape protruding from a front surface of an attachment part to which the rotary operation part is attached, and wherein the display part is disposed on a surface inside the rotary operation part in a radial direction of the rotary operation part, and
wherein the CPU moves the image on the surface of the dial opposite to the rotation direction when the rotation operation is performed so that the image appears to maintain a same position on the dial to the user.

* * * * *